US006252617B1

(12) United States Patent
Hasegawa et al.

(10) Patent No.: US 6,252,617 B1
(45) Date of Patent: *Jun. 26, 2001

(54) INK JET RECORDING METHOD

(75) Inventors: Kenji Hasegawa; Koichi Toma; Isao Kimura, all of Kawasaki; Atsushi Shiozaki, Nagahama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/067,850

(22) Filed: May 27, 1993

(30) Foreign Application Priority Data

May 29, 1992 (JP) .................................................... 4-139171

(51) Int. Cl.[7] ...................................................... G01D 11/00

(52) U.S. Cl. .............................................................. 347/100

(58) Field of Search ................................ 346/1.1, 140 R; 347/100; 106/31.27, 31.6, 31.13

(56) References Cited

U.S. PATENT DOCUMENTS

| | | | | |
|---|---|---|---|---|
| 4,345,262 | | 8/1982 | Shirato et al. | 346/140 R |
| 4,459,600 | | 7/1984 | Sato et al. | 346/140 R |
| 4,463,359 | | 7/1984 | Ayata et al. | 346/1.1 |
| 4,558,333 | | 12/1985 | Sugitani et al. | 346/140 R |
| 4,723,129 | | 2/1988 | Endo et al. | 346/1.1 |
| 4,740,796 | | 4/1988 | Endo et al. . | |
| 4,832,984 | | 5/1989 | Hasegawa et al. | 427/161 |
| 5,142,308 | | 8/1992 | Hasegawa et al. | 346/140 R |
| 5,148,191 | | 9/1992 | Hasegawa et al. | 346/140 R |
| 5,220,346 | * | 6/1993 | Carreira et al. | 346/1.1 |
| 5,296,023 | * | 3/1994 | Gregory et al. | 106/22 D |

FOREIGN PATENT DOCUMENTS

| | | |
|---|---|---|
| 0428730 | 5/1991 | (EP) . |
| 54-56847 | 5/1979 | (JP) . |
| 55-126462 | 9/1980 | (JP) . |
| 59-43315 | 3/1984 | (JP) . |
| 59-96971 | 6/1984 | (JP) . |
| 59-123670 | 7/1984 | (JP) . |
| 59-138461 | 8/1984 | (JP) . |
| 60-71260 | 4/1985 | (JP) . |
| WO90/09887 | 9/1990 | (WO) . |
| WO90/09888 | 9/1990 | (WO) . |

OTHER PUBLICATIONS

Japanese Abstracts of Japan, vol. 6, No. 40 (C–094), with respect to Japanese Patent Document No. 56–155263 (Dec. 1, 1981).

Japanese Abstracts of Japan, vol. 4, No. 179 (M–46), with respect to Japanese Patent Document No. 55–126462 (Sep. 30, 1980).

* cited by examiner

*Primary Examiner*—John Barlow
*Assistant Examiner*—Michael Brooke
(74) *Attorney, Agent, or Firm*—Fitzpatrick, Cella, Harper & Scinto

(57) ABSTRACT

An ink directly contacts a heating resistor which forms a portion of an electrothermal transducer. The ink is ejected from orifices by using thermal energy generated by supplying an electric current to the heating resistor. The concentration of alkali metal ion is equal to or less than $5\times10^{-3}$ mol/l.

5 Claims, 3 Drawing Sheets

INK JET RECORDING METHOD

BACKGROUND OF THE INVENTION

1. Field of the Invention

The present invention relates to an ink jet recording method using an ink jet system in which bubbles are developed in liquid for recording or ink by using thermal energy generated by electric current feed so as to eject the ink and more particularly to an ink jet recording method which consumes very little electricity in the whole circuit and results in very little losses of electric power, and which has a good responsibility to an input signal.

2. Description of the Prior Art

The ink jet system has become of major interest lately, because it can print out at high speed and high density and because it is suitable to a color and/or compact system. In this system, there is a heating portion which allows heat to act on the liquid in order to eject liquid for recording such as ink by using thermal energy. The heating portion includes a heating resistor, and is similar in construction to a so-called conventional thermal head.

However, the ink jet system is very different from the conventional thermal head in the following points. First, the heating portion directly contacts the ink. Second, the heating portion is subjected to mechanical shock by cavitation erosion due to the repetition of the development and collapse of the bubbles. Third, the heating portion is placed under severe conditions of the repetition of sudden elevation or sudden drop in temperature around 1000° C. within a short period from zero point and several micro seconds to several micro seconds.

In the conventional ink jet recording head, a first layer is formed on the heating resistor of the heating portion, the first layer consisting of materials such as $SiO_2$, SiC, $Si_3N_4$ and so on. The first layer serves as the electrical insulation for the heating resistor and prevents it from the oxidation thereof. A second layer is formed on the first layer and consists of a material such as Ta. Generally, the conventional ink jet recording head has the heating resistor of the heating portion which is protected by the above layers from use environment.

On the other hand, $Ta_2O_5$ is generally used as a material of a wear resistant layer of the thermal head, but it does not always have resistivity against the cavitation erosion. As disclosed in, for example, Japanese Patent Application Publication No. 43315/1984, materials such as Ta, Ti and alloys including them are conventionally used as having strong resistivity against the cavitation erosion. The publication relates to a liquid injection recording head. It has been desired to allow thermal energy to act on the ink as efficiently and as fast as possible in order to alleviate the burden on the input signal and to reduce power consumption in the heating portion. Therefore, besides the recording head having such a protective coat, a different type of recording head having a structure such that a heating resistor directly contacts an ink (hereinafter abbreviated as a passivation free type) is proposed in Japanese Patent Application Publication No. 126462/1980. This type of the recording head is superior to the former in thermal efficiency. However, the heating resistor of the passivation free type recording head is exposed to not only the cavitation erosion and the sudden elevation and drop in temperature but also to the electrochemical reaction which is caused by passing a current through an ink having electrical conductivity.

In order to solve the above problems, a variety of metals, alloys, metallic compounds, cermets, in addition to $Ta_2N$ and $RuO_2$ are known as a material for the heating resistor of the conventional recording head. However, any materials described above do not have enough durability and stability to meet the necessary requirements. Ta-based alloy is proposed as a material of a heating resistor for the passivation free ink jet recording head, for example, in Japanese Patent Application Laying-open No. 96971/1984.

The above described ink jet recording head having the protective coat is available for practical use in consideration of the durability and the change of resistance. However, it is very difficult to avoid completely the occurrence of defects during the formation of the protective coat. These defects become the major factor that drops yield in mass production. Recently, with increasing requirements for high speed recording and high density of information to be recorded, and of increasing the number of nozzles per recording head, these problems become greater.

When the efficiency of thermal conductivity from the heating resistor to the ink is low, the power consumption increases as a whole, and the change in temperature of the whole head becomes greater on driving. The change of temperature of the head causes the change of volume of the ejected liquid, thus producing unevenness of density on a recorded image. In other words, when the volume of ejected liquid becomes larger, the density of pixels on a medium becomes higher. Conversely, the volume of ejected liquid becomes smaller, the density of pixels on a medium becomes lower.

Further, when increasing the number of ejections per unit time in order to record at a high speed, the power consumption at the head increases, and the unevenness of image density becomes more remarkable. This is one of the problems to be solved, because it goes against the requirement for high quality of the recorded image.

In order to solve such problems, it is desired to obtain an ink jet recording head that is practical as a head which is useful in an ink jet recording method, in which the heating resistor thereof directly contacts the ink, and in which the thermal efficiency in the heating portion is superior to the conventional ones and is independent from the defects of the protective coat.

As described above, in the passivation free type ink jet recording head, the heating resistor is exposed to not only the cavitation erosion and the sudden elevation and drop in temperature, but also the electrochemical reaction. In the conventional heating resistor, which consists of materials such as $Ta_2N$, $RuO_2$ or $HfB_2$, there are problems in durability such that it is easily mechanically broken, corroded or resolved. Materials having resistivity against the cavitation erosion described in the Japanese Patent Application Publication No. 43315/1984 can be effective only when they are used as the protective coat described above. However, they do not have enough durability when used as a material for a heating resistor for the passivation free type of the ink jet recording head. The stability of ejection of ink is essential to record at a high level of definition and high quality. Therefore, it is desirable that the resistance variation of the heating resistor is small, preferably less than 5% in practice use. When Ta-based alloy as described in Japanese Patent Application Laid-Open No. 96971/1984, for example, is used as a heating resistor of the passivation free type recording head, the alloy has relatively good durability in that the heating resistor does not break.

However, Ta or Ta—Al alloy varies its value of resistance to the extent of 7 to 10% during the repetition of the development and collapse of bubbles, thus such alloys are not satisfactory in practice use.

In addition, the ratio M of the bubbling threshold voltage (Vth) to the applied pulse voltage (Vbreak) at which the resistor may break is in the range of from 1.3 to 1.4, and thus the thermal stability of them is not so good, and there is a problem that the life of resistor greatly decreases by only a small amount of increase of a driving voltage (Vop).

As described above, when the passivation free type heating resistor is formed by any one of the conventional materials, none of such materials satisfy all of mechanical durability against the cavitation erosion, electrochemical stability, stability of resistance, heat resisting oxidation, heat resisting smelting and heat resisting shock.

The inventors found that the alloy which has one of Ta, Ir, or Al as a principal component is superior as a heating element of a passivation free type of an ink jet system. For example, Japanese Patent Application No. 503976/1990 (WO 90/09887) discloses Al—Ta—Ir alloy as materials for a heating resistor. Japanese Patent Application No. 503977/1990 (WO 90/09888) discloses Ta—Ir alloy as materials for a heating resistor. A passivation free type ink jet recording head having high durability may be prepared by these alloy materials.

On the one hand, it is however necessary to lower the cost of an integrated circuit or IC for driving and to reduce the power loss in a line. In order to achieve the above object, it is desired that an ink jet recording head is driven at a high voltage and at a low current by using the heating resistor with high resistance. In such a case, since the driving voltage is high, the ink jet recording head is exposed to more severe conditions. It has been found that sufficient durability of the alloy material cannot be obtained under such a severe condition even if the above alloy material is used.

With respect to the ink, if non-aqueous ink having a small electric conductivity can be used, it is possible to reduce the above electrochemical reaction. An example of the non-aqueous ink is one in which an oil soluble dye is dissolved in a liquid medium including an organic solvent as a main component.

However, in general, there is a problem in that an oil soluble dye is inferior to a water system in solubility and stability in the liquid medium component, wear-resistance and light-resistance, and especially safety and so on.

SUMMARY OF THE INVENTION

An object of the present invention is to provide an ink jet recording method in which a passivation free type ink jet recording head is safely driven at a relative high voltage for a long period by utilizing the merits of the head and the water system ink.

There is provided an ink jet recording method comprising the steps of: contacting directly an ink with a heating resistor; generating thermal energy by feeding electric current to the heating resistor; developing bubbles of the ink by the thermal energy from the heating resistor to eject the ink grown in bubble shape; and performing recording by using the ink ejected; wherein the ink contains an alkali metal ion whose concentration is equal to or less than $5\times10^{-3}$ mol/l.

Here, the heating resistor may include at least one element selected from the group consisting of Ru, Rh, Pd, Os, Ir and Pt.

More specifically the heating resistor may include at least one element selected from the group consisting of Ru, Ir and Pt, and at least one element selected from the group consisting of Al, Ti, V, Cr, Ga, Zr, Nb, Hf and Ta.

The ink substantially may include at least one kind of cation selected from a first group consisting of hydrogen ions (hydronium ions), ammonium ions, aliphatic ammonium ions and heterocyclic ammonium ions, and wherein the concentration of another kind of cation, which are different from the cations included in the first group, is equal to or less than $5\times10^{-3}$ mol/l.

Here, the ink may include water as one of a main part of the ink.

The alloy material may be produced by using the conventional method such as a sputtering method and a vacuum deposition method.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1A:
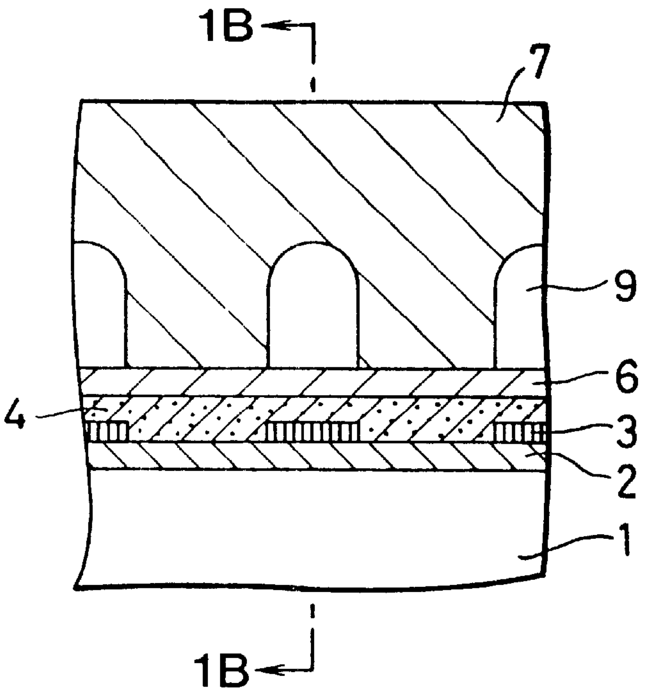
FIG. 1A is a partial sectional front view showing an ejection hole of an ink jet recording head which can be used in an embodiment of an ink jet recording method according to the present invention.
Figure 1B:
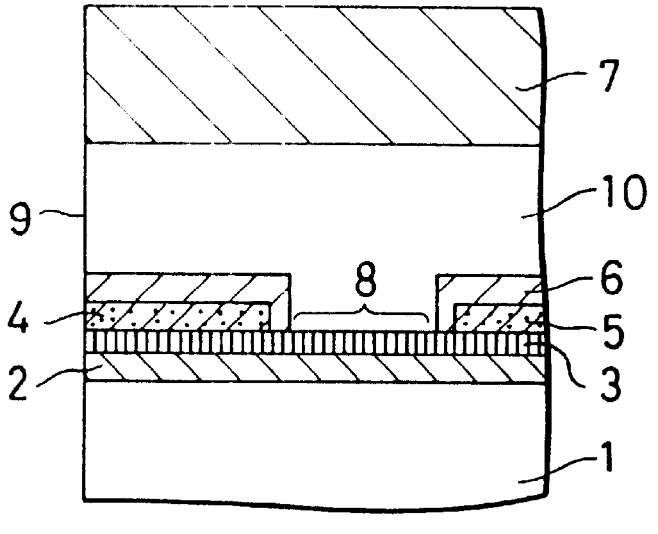
FIG. 1B is a partial sectional view taken along the line 1B—1B of FIG. 1A.
Figure 2A:
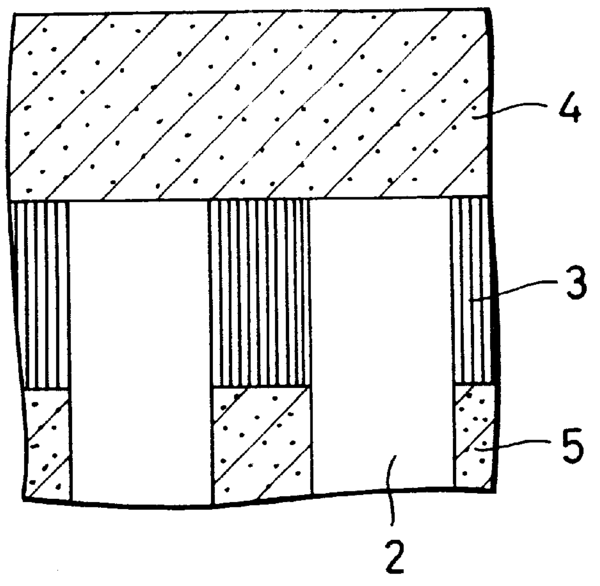
FIG. 2A is a partial plan view showing an electrothermal transducer of the ink jet recording head shown in FIG. 1.
Figure 2B:
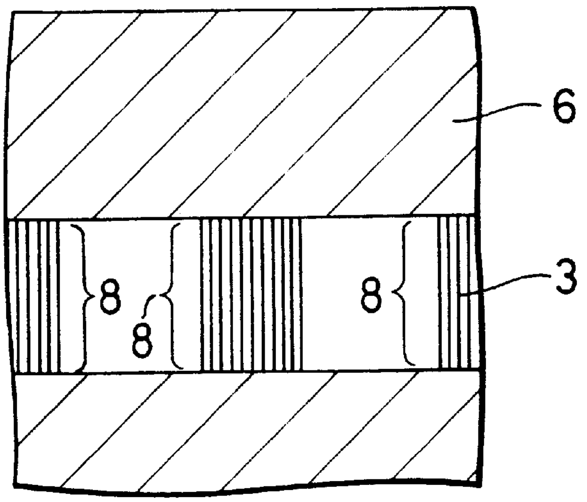
FIG. 2B is a partial plan view showing a layer for protecting an electrode, the layer being formed on the electrothermal transducer shown in FIG. 2A.

FIG. 1A is a partial sectional front view showing an ejection hole of an ink jet recording head which can be used in an embodiment of an ink jet recording method according to the present invention, and FIG. 1B is a partial sectional view taken along the line 1B—1B of FIG. 1A. FIG. 2A is a partial plan view showing an electrothermal transducer of the ink jet recording head shown in FIG. 1A, and FIG. 2B is a partial plan view showing a layer for protecting an electrode, the layer formed on the electrothermal transducer shown in FIG. 2A.

At first, by referring to FIGS. 1A and 1B, an example of a fabricating method of the ink jet recording head applicable to the present invention is outlined below. In FIGS. 1A and 1B, reference numeral 1 is a substrate which is made of silicon and so on. A lower layer 2 is formed on the surface of the substrate 1 by using thermal oxidation method. The lower layer 2 is made of, for example, silicon dioxide. The substrate 1 having the lower layer 2 serves as a support member of an electrothermal transducer which will be described later. A heat generation resistance layer 3 is formed on the lower layer 2 by spattering method using Ta target and Ir target. An electrode layer is formed on the heat generation resistance layer 3 by changing the Au target to Ta and Ir targets during the spattering step which is continuous from the previous step. A photo resist layer having a designated shape is formed on the electrode layer by photo-lithography technology. As shown in FIGS. 1B and 2A, electrodes 4 and 5 are formed by patterning the above electrode layer. The patterning includes dry etching. Another photo-resist having a designated shape is formed on the electrodes 4 and 5 and heat generation resistance layer 3 by photo-lithography technology. As shown in FIG. 1A, the heat generation resistance layer 3 is subjected to patterning such as dry etching using ion milling. An electrothermal transducer is defined by the heat generation resistance layer 3 and the electrodes 4 and 5. An electrode protection layer 6 is formed by spattering so as to cover at least the electrodes 4 and 5 of the electrothermal transducer. The electrode protection layer 6 is made of, for example, silicon dioxide. The electrode protection layer 6 is shaped in a designated pattern by photo-lithography technology and reactive ion etching. As shown in FIGS. 1A and 1B, a member 7 is bonded onto the substrate 1 having a multi-layer structure as described above. The member 7 has a channel to be used as a fluid route to be described later. With this structure, a fluid route 10 is formed in a space defined between the substrate 1 and the member 7. The fluid route 10 serves to lead ink fluids from an ink tank (not shown) to a heating portion 8 formed as a part of the electrothermal transducer and lead ink fluids from the heating portion 8 to an orifice 9 driven by the pressure wave due to voids generated by thermal energy generated by the heating portion 8.

In this embodiment, the electrothermal transducer has the electrodes 4 and 5, and a heat generation part of the heat generation resistance layer 3, the heat generation part being a resistor defined between these electrodes 4 and 5. A base body of the ink jet recording head is defined by a support member, the above electrothermal transducer and the protection layer 6, the support member including the substrate 1 and the lower layer 2. The heating portion 8 for transmitting thermal energy to ink fluids is a part of the heat generation part which is not covered by the protection layer 6. The lower part 2 is arranged, if necessary, and serves to control the quantity of heat to be transferred to the substrate 1 and transfer heat generated at the heat generation part efficiently to the ink fluids. The electrodes 4 and 5 are used for supplying the electric power to the heat generation resistance layer 3 in order to generate heat from the heat generation part. In this embodiment, the electrode 4 is a common electrode to be connected to each of the heat generation parts, and the electrode 5 is a selective electrode to be connected to a designated individual heat generation part. The electrode protection layer 6 is used for preventing the electrodes 4 and 5 from being damaged chemically by ink fluids and for keeping electric insulation between adjacent electrodes. The thickness of the heat generation resistance layer 3 of this embodiment can be determined optimally so that thermal energy may be obtained effectively at desirable conditions with respect to voltage and electric current applied to the electrodes, and in a preferable case, its value is defined between 100 Å and 20,000 Å, and in a more preferable case, its value is defined between 200 Å and 5,000 Å.

Figure 3:
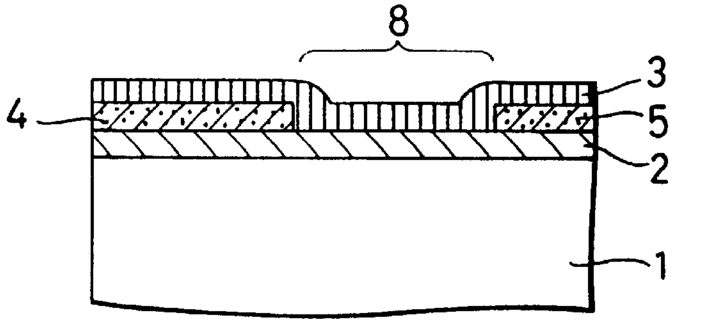
FIG. 3 is a partial sectional view showing a main portion of an electrothermal transducer of an ink jet recording head which can be used in another embodiment of an ink jet recording method according to the present invention.

As for the electrothermal transducer in the ink jet recording head applicable to the present invention, its structure is not limited to that shown in FIGS. 1A, 1B, 2A and 2B but allowed to have various modifications. What is basically acceptable and applicable to the present invention is the structure in which the ink fluid to be ejected from the orifice of the ink jet recording head and the electrothermal transducer are directly contacted to each other. For example, referring to the structure of the electrothermal transducer of the ink jet recording head as shown in FIG. 3, the electrodes 4 and 5 patterned in a designated shape are directly formed above the lower part layer 2 on the silicon substrate 1. In this modification shown in FIG. 3, the heat generation resistance layer 3 is formed above these electrodes 4 and 5 and the lower part layer 2 developed between these electrodes. In such a structure as shown in FIG. 3, the electrodes 4 and 5 are covered by the heat generation resistance layer 3, and accordingly each of the electrode protection layers 6 shown in FIGS. 1A, 1B, 2A and 2B is not necessary.

Figure 4A:
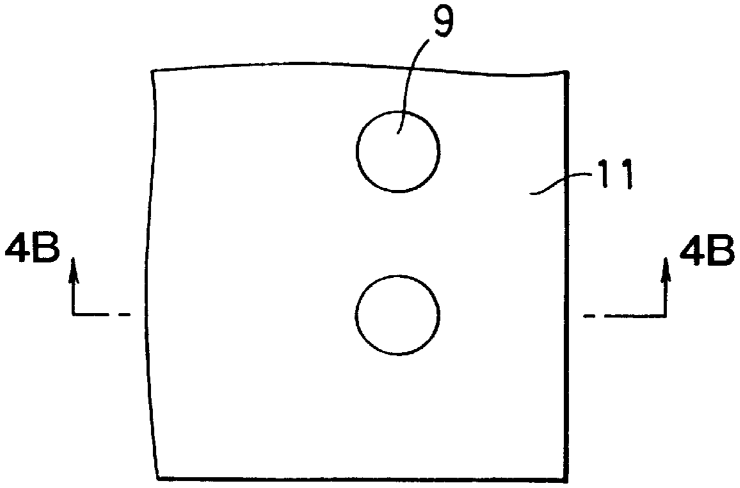
FIG. 4A is a plan view showing an ejection hole of an ink jet recording head which can be used in another embodiment of an ink jet recording method according to the present invention.
Figure 4B:
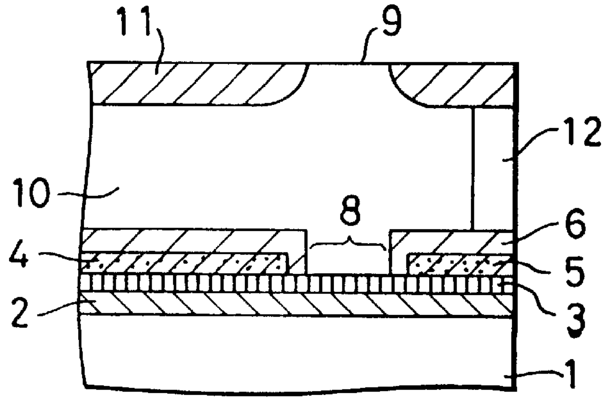
FIG. 4B is a partial sectional view taken along the line 4B—4B of FIG. 4A.

The positioning of the electrothermal transducer relative to the orifice 9 and the fluid route 10 in the ink jet recording head applicable to the present invention is not limited to the example of the structure shown in FIGS. 1A, 1B, 2A and 2B. The direction in which ink fluids are supplied toward the heating part 8 and the direction in which ink is ejected are not limited to be parallel to each other as shown in FIGS. 1A and 1B, but it is allowed that the direction in which ink fluids are supplied and the direction in which ink drops are ejected may be selected so as to intersect each other in an arbitrary angle, especially, perpendicularly. Reference numeral 11 in FIGS. 4A and 4B is an orifice plate having the orifice 9 with an adequate thickness, and a component 12 is a support wall for supporting the orifice plate.

It is allowed that a plurality of ink ejection units, each composed of an orifice, a fluid route and a heating portion, may be arranged for forming a single recording head as shown in FIGS. 1A, 1B, 4A and 4B. For example, a plurality of ink ejection units may be arranged along the whole range of recording region corresponding to the width of the recording medium.

As for the component of ink fluids used in the ink jet recording head of the present invention, for example, it is possible to use a water-based solution and a recording agent, such as a dye, dissolved in it. The solution can be selected to include various kinds of organic solvent as well as water.

In addition, it may be allowed to use additional agents as well as the recording agent. However, it is necessary to maintain the ion density of alkaline metals such as $Li^+$, $Na^+$ and $K^+$ is $5\times10^{-3}$ mol/l or less, and preferably $2\times10^{-3}$ mol/l or less.

In case of using water-based ink fluids, it is effective to use a recording agent such as dye containing ions in a certain degree. In such a case, it is preferable to use either of hydrogen ions, ammonium ions, aliphatic ammonium ions, heterocyclic ammonium ions, or their compounds.

More specifically, materials for recording that are dissolved in a solvent involving water as its major component may include a dye having anionic radicals such as $—SO_3{}_-$ and $—COO^-$, and its counter ion selected from the group consisting of hydrogen ions (hydronuim ions), ammonium ions, aliphatic ammonium ions or heterocyclic ammonium ions, and their combinations thereof. In contrast, a dye may include cationic ions such as ammonium radicals and its counter ion may be $—NO_3—$ and $—HSO_4—$ and so on.

It is allowed that the additional agent used may be an electrolyte, but it is preferrable not to use an agent including alkaline metal ions and it is necessary of the cationic radicals to include a hydrogen ion and various kinds of ammonium ions.

The inventors of the present invention found that the alloy material including Ta and Ir or the alloy material including Al, Ta and Ir are good as a component of the heat generation resistance in the passivation free type ink jet recording head. In the continuous research after this conclusion, what we have found is that the alloy material including at least one element of Ru, Ir and Pt and at least one element of Al, Ti, V, Cr, Ga, Ze, Nb, Hf and Ta has good mechanical durability measured in terms of cavitation erosion resistivity, electrochemical stability and heat resistance property in order to form a passivation free heat generation resistance. By means of using these materials for forming the heat generation resistance, a passivation free type ink jet recording head which can be used in a practical field can be obtained under the condition if the driving voltage to the recording head is relatively low. However, there are such requirements as driving the recording head in higher voltage and lower current by increasing the resistance of the heat generation resistance, so as to push down the cost of drive IC's and reduce the power loss in the electric wiring as ultimate goals. So far, in the case of using a passivation free type recording head and driving the recording head in a higher voltage, an electrochemical reaction occurs under a severe condition and as a result, it is found that enough durability of the recording head even composed of the above mentioned materials may not be obtained. The inventors of the present invention have concluded that the major factor for reducing the durability of the recording head is electrochemical damage to the cathodic portion of the heat generation resistance (heater) by experimental observation and consideration, and that this damage is more severe when using ink fluids including alkaline metal ions such as $Li^+$ and $Na^+$. The inventors have also found that the durability of the recording head can be attained by reducing the density of alkaline metal ions in the ink fluids. Furthermore, it has been proved that positive ions such as hydrogen ions, ammonium ions, aliphatic ammonium ions, and heterocyclic ammonium ions even staying in the ink fluids hardly effect any damage to the cathodic portion. Therefore, by using the passivation free type ink jet recording head having a heat generation resistance composed of the above described alloy materials and using a water-based ink fluid including little amounts of alkaline metal ions, what can be obtained is a recording method that provides higher thermal efficiency, input signal responsibility, and higher safety and reliability, and even enough durability of the recording head even if driving the recording head in a higher voltage applied between electrodes of the heat generation resistance. The recording head can be more durable when driving the recording head at an ordinary voltage used for conventional recording heads.

The present invention achieves distinctly advantageous effects when applied to a recording head or a recording apparatus which has means for generating thermal energy such as electrothermal transducers, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces a sudden temperature rise that exceeds the nucleate boiling so as to cause the film boiling on heating portions of the recording head; and third, bubbles are developed in the liquid (ink) corresponding to the drive signals. By using the development and collapse of the bubbles, the ink is expelled from at least one of the ink ejection orifices of the head to form one or more ink drops. The drive signal in the form of a pulse is preferable because the development and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-Open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used. For example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation. The ink is transformed from a solid to a liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-Open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Now, in referring to the following preferred embodiments, the present invention will be more fully described.

[Embodiment 1-1]

1) Fabrication of Passivation-Free Type Ink Jet Recording Head

At first, a silicon substrate as a support member was subjected to thermal oxidation, and the $SiO_2$ layer having a thickness 2.5 μm was formed as a lower part layer. Next, the support member on which the $SiO_2$ layer is formed was installed in the high-frequency spattering apparatus (for example, CFS-8EP, Tokuda Seisakusho Co., Japan), and the heat generation resistance layer having a thickness about 1000 Å was formed on the $SiO_2$ layer by spattering process in the following condition using Ta target having purity 99.9 weight% or more and Ir sheet having the same purity placed on Ta target;

| Spattering Condition | |
|---|---|
| Target Area Ratio | Ta:Ir = 68:32, |
| Target Area | 5 inchø, |
| High-Frequency Power | 500W, |
| Temperature on Substrate | 50° C., |
| Development Time | 12 min, and |
| Argon Gas Pressure | 0.4 Pa. |

Next, the Ta target was replaced with an Au target, and an Au layer having 6000 Å in thickness was formed by a spattering method.

After the spattering step, by photo-lithography technology, photo resist was formed twice in a designated pattern, respectively, in which the Au layer was subjected to dry etching at first and the heat generation resistance layer was subjected to dry etching with ion milling. So far, the heat generation resistance layer 3 and the electrodes 4 and 5 were formed as shown in FIGS. 1B and 2A. The size of the heat generation resistance part was 30 μm×170 μm, and the pitch between adjacent heat generation resistance parts was 125 μm, and 24 heat generation resistance parts were arranged in a one-dimensional array. Another $SiO_2$ layer was further developed on the surface of these heat generation resistance parts by spattering, and this $SiO_2$ layer was shaped in a pattern by photo-lithography technology and reactive ion etching process so that the pattern of the shaped $SiO_2$ layer may cover the both ends of the heat generation part in 10 μm and the electrodes. Therefore, the finished size of the heating portion was 30 μm×150 μm in dimensions. In order to form the orifice 9 and the fluid route 10 shown in FIGS. 1A and 1B, a grass board having a channel was bonded on the substrate and finally the ink jet recording head was completed. A plurality of recording heads fabricated in the above described process were tested and estimated with ink fluids to be described later.

2) Preparation of Ink Fluid

A dye of CI Food Black 1 (Na salt) designated FB1Na in the following was commercially available. The FB1Na is dissolved in water to obtain a 10% solution thereof. A solution of hydrogen chloride was added to the solution containing FB1Na until the pH of the mixed solution reached 1 or less, thereby separating a solid component from the mixed solution. The solid component of the solution was subjected to the repetition of (a) concentration by centrifugal separation and (b) washing with a solution of hydrogen chloride. The repetition was continued until Na in the dye was finally replaced with H to remove completely Na from the dye.

Then, the dye was subjected to reducing pressure, drying and caking to remove an excess of HCl, and thereby obtaining an acid type dye of Food Black 1. 10% aqueous solution of this acid type dye was prepared. The pH of the solution was about 1.4. This aqueous solution (hereinafter referred to as FB1H) was neutralized by adding 10% aqueous solution of triethanolamine thereto, thus preparing the solution so as to be about pH 7. Diethylene glycol and water was added to the aqueous solution so as to satisfy the following conditions:

the composition of solvent water/diethylene glycol=7/3; and the concentration of dye 0.03 mol/l. Here, $Na^+$ concentration of the thus obtained ink was less than 10 ppm ($4.3\times10^{-6}$ mol/l).

3) Assessment

3)-1 Measurement of Composition of Heating Element

In the previous section 1), before the grooved plate made of glass is bonded, the composition of the heating element at a thermal active portion was obtained by an EPMA (Electron Probe Micro Analysis, Shimazu Seisakusho Co., EPM-810) method.

3)-2 Ejection Durability Examination

By supplying ink of the previous section 2) into a fluid route 10, and applying rectangular pulse voltage with 7μ seconds width and the frequency of 2 kHz from the external power supply to the electrodes 4 and 5, while gradually increasing the voltage, ejection threshold voltage (Vth) was obtained, at which the ink starts to eject from the orifice. Next, the number of pulses applied until the heating portion 8 breaks and the ejection stops was measured by applying pulses with a voltage of 1.2 Vth and continuously ejecting.

3)-3 Print Grade

After providing the head of the section 1) to the conventional recording apparatus and printing characters by using the ink of the section 2), the resultant print was assessed visually. The results were listed in Tables 1, 2, 3a and 3b, along with the results of the following embodiments and examples of comparison.

Embodiments 1-2 to 1-9

Except that the area ratio of each of the raw materials of sputtering targets had been changed variously according to Table 1 when forming the materials of the heat resister, the ink jet head was fabricated in a manner similar to the embodiment 1. Further, like assessment was performed by using the same ink as in embodiment 1-1.

Embodiments 2-1 to 2-9

In the preparation of the ink of the section 2) of the embodiment 1-1, CI Food Black 2 (Na salts) (hereinafter referred to as a FB2Na) was used instead of FB1Na dye, and diethylamine instead of triethanolamine. As a result, the ink containing amine compound dye was prepared. The ejection durability examination and the print grade was assessed by using this ink and the ink jet recording head similar to any one of the embodiments 1-1 to 9. Here, FB2Na combined with diethylamine is defined as FB2DEA.

Embodiment 3

In the section 2) of the embodiment 1-1, like ink was prepared by acid dye (FB1H) obtained before neutralizing with triethanolamine. Then, like ejection durability examination and like print grade was assessed for this ink and the head made as in the embodiment 1-1.

Embodiment 4

Instead of the ink of the section 2 of the embodiment 1-1, it was prepared by dissolving ammonium acetate into the same solvent composition until the concentration of the ink become 0.1 mol/l. The ejection durability examination was performed by using this ink (hereinafter referred to as $AcONH_4$) and the ink jet recording head of the embodiment 1-1.

Embodiments 5-1 to 5-3

Instead of using the ink of the embodiment 1-1, three kinds of ink were prepared by dissolving lithium acetate (hereinafter referred to as AcOLi), sodium acetate (hereinafter referred to as AcONa), and potassium acetate (hereinafter referred to as AcOK) into the same solvent composition, respectively, until the concentration of each of the inks become $5\times10^{-3}$ mol/l. The ejection durability examinations were performed by using these inks and the ink jet recording heads of the embodiment 1-1.

Embodiments 6-1 to 6-3

Instead of the ink of the embodiment 1-1, three kinds of ink were prepared by dissolving AcOLi, AcONa, and AcOK into the same solvent composition, respectively, until the concentration of each of the inks become $2\times10^{-3}$ mol/l. The ejection durability examinations were performed by using these inks and the ink jet recording heads of the embodiment 1-1.

Embodiment 7

The ink was prepared only by using the solvent composition which does not contain amine and the ink dye of the embodiment 1-1. Then, the ejection durability examination was performed by this ink and the head of the embodiment 1-1.

Comparison Examples 1-1 to 1-9

They were obtained under the same condition as those of the embodiments 1-1 to 1-9 except that the ink using FB1Na itself as dye was used.

Comparison Examples 2-1 to 2-9

They were obtained under the same conditions as those of the embodiments 1-1 to 1-9 except that the ink using FB2Na itself as dye was used.

Comparison Examples 3-1 to 3-3

Three kinds of ink were prepared by dissolving AcOLi, AcONa, and AcOK into the same solvent composition, respectively, until the concentration of the each of the inks become 0.1 mol/l. The ejection durability examinations were performed by using these inks and the ink jet recording heads of the embodiment 1-1.

Comparison Examples 4-1 to 4-3

Three kinds of ink were prepared by dissolving AcOLi, AcONa, and AcOK into the same solvent composition, respectively, until the concentration of the each of the inks become 0.01 mol/l.

TABLE 1

| No. of Embodiment | Target Ratio | Composition of Ink heating resistor | Ink | Ejection Durability | Print Grade |
|---|---|---|---|---|---|
| 1-1 | Ta68-Ir32 | Ta40-Ir60 | FB1TEA | 10< | very good |
| 2 | A137-Ir63 | Al 8-Ir92 | | 10< | " |
| 3 | Ti53-Ir47 | Ti23-Ir77 | " | 10< | " |
| 4 | Cr61-Ir39 | Cr32-Ir68 | " | 10< | " |
| 5 | Ta37-Pt63 | Ta38-Pt62 | " | 8.0 | " |
| 6 | Cr72-Ru28 | Cr60-Ru40 | " | 10< | " |
| 7 | Al43-Ta25-Ir32 | Al13-Ta31-Ir56 | " | 10< | " |
| 8 | Ti39-Ta20-Ir41 | Ti14-Ta18-Ir68 | " | 10< | " |
| 9 | Cr62-Ru13-Ir25 | Cr45-Ru17-Ir38 | " | 10< | " |

The number of the column of the Ejection Durability is described by using the ratio when the value of the comparison example 1-1 is numeral 1.

TABLE 2

| No. of Embodiment | Composition of heating resistor | Ink | Ejection Durability | Print Grade |
|---|---|---|---|---|
| 2 - 1 | same as 1-1 | FB2DEA | 10< | very good |
| 2 | same as 1-2 | " | 10< | " |
| 3 | same as 1-3 | " | 10< | " |
| 4 | same as 1-4 | " | 10< | " |
| 5 | same as 1-5 | " | 7.0 | " |
| 6 | same as 1-6 | " | 10< | " |
| 7 | same as 1-7 | " | 10< | " |
| 8 | same as 1-8 | " | 10< | " |
| 9 | same as 1-9 | " | 10< | " |
| 3 | same as 1-1 | FB1H | 10< | good |
| 4 | same as 1-1 | $AcONH_4$ 0.1 | 10< | |
| 5 - 1 | same as 1-1 | AcOLi $5\times10^{-3}$ | 4.0 | |
| 2 | same as 1-1 | AcONa $5\times10^{-3}$ | 3.0 | |
| 3 | same as 1-1 | AcOK $5\times10^{-3}$ | 3.0 | |
| 6 - 1 | same as 1-1 | AcOL $2\times10^{-3}$ | 10< | |
| 2 | same as 1-1 | AcONa $2\times10^{-3}$ | 8.0 | |
| 3 | same as 1-1 | AcOK $2\times10^{-3}$ | 8.0 | |
| 7 | same as 1-1 | Just solvent | 10< | |

TABLE 3a

| No. of Embodiment | Composition of heating resistor | Ink | Ejection Durability | Print Grade |
|---|---|---|---|---|
| 1 - 1 | same as 1-1 | FB1Na | 1.0 | very good |
| 2 | same as 1-2 | " | 0.9 | " |
| 3 | same as 1-3 | " | 1.3 | " |
| 4 | same as 1-4 | " | 1.2 | " |
| 5 | same as 1-5 | " | 0.7 | " |
| 6 | same as 1-6 | " | 1.5 | " |
| 7 | same as 1-7 | " | 1.4 | " |
| 8 | same as 1-8 | " | 1.2 | " |
| 9 | same as 1-9 | " | 1.0 | " |

TABLE 3a-continued

| No. of Embodiment | Composition of heating resistor | Ink | Ejection Durability | Print Grade |
|---|---|---|---|---|
| 2 - 1 | same as 1-1 | FB2Na | 1.0 | " |
| 2 | same as 1-2 | " | 0.9 | " |
| 3 | same as 1-3 | " | 1.2 | " |
| 4 | same as 1-4 | " | 1.1 | " |
| 5 | same as 1-5 | " | 0.7 | " |
| 6 | same as 1-6 | " | 1.3 | " |
| 7 | same as 1-7 | " | 1.4 | " |
| 8 | same as 1-8 | " | 1.2 | " |
| 9 | same as 1-9 | " | 1.1 | " |

TABLE 3b

| No. of Embodiment | Composition of heating resistor | Ink | Ejection Durability |
|---|---|---|---|
| 3 - 1 | same as 1-1 | AcOLi 0.1 | 0.3 |
| 2 | " | AcONa 0.1 | 0.2 |
| 3 | " | AcOK 0.1 | 0.2 |
| 4 - 1 | " | AcOLI 0.01 | 1.0 |
| 2 | " | AcOLI 0.01 | 0.8 |
| 3 | " | AcOLI 0.01 | 0.7 |

As described above, according to the present invention, it is possible to obtain the improved ink jet recording method which excels in thermal efficiency, stability of a signal, and safety, and which has acceptable durability.

The present invention has been described in detail with respect to preferred embodiments, and it will now be understood that changes and modifications may be made without departing from the invention in its broader aspects, and it is the intention, therefore, in the appended claims to cover all such changes and modifications as may fall within the true spirit of the invention.

What is claimed is:

1. An ink jet recording method, comprising the steps of:

providing an ink jet head having a heating resistor that directly contacts an ink;

providing a water-based ink containing an ionic dye having a counter ion selected from the group consisting of a hydrogen atom, an ammonium ion, an aliphatic ammonium ion and a heterocyclic ammonium ion;

ejecting said ink from said ink jet head by feeding electric current to said heating resistor and adding thermal energy to said ink; and attaching the ejected ink on a surface of a recording medium, wherein said ink has an alkali metal ion concentration of $5\times10^{-3}$ mol/liter or less.

2. A method as claimed in claim 1, wherein said heating resistor includes at least one element selected from the group consisting of Ru, Rh, Pd, Os, Ir and Pt.

3. A method as claimed in claim 1, wherein said heating resistor includes at least one element selected from the group consisting of Ru, Ir and Pt, and at least one element selected from the group consisting of Al, Ti, V, Cr, Ga, Zr, Nb, Hf and Ta.

4. A method as claimed in claim 1 where said dye in said water-based ink comprises anionic radicals.

5. A method as claimed in claim 1, wherein said dye in said water-based ink comprises cationic ions.

* * * * *